United States Patent
Sugano et al.

(10) Patent No.: US 12,235,123 B2
(45) Date of Patent: Feb. 25, 2025

(54) VEHICLE NAVIGATION APPARATUS

(71) Applicant: SUBARU CORPORATION, Tokyo (JP)

(72) Inventors: Chihiro Sugano, Tokyo (JP); Masato Yano, Tokyo (JP); Shuntaro Noguchi, Tokyo (JP); Naoto Kuriyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 18 days.

(21) Appl. No.: 17/850,482

(22) Filed: Jun. 27, 2022

(65) Prior Publication Data
US 2023/0009755 A1  Jan. 12, 2023

(30) Foreign Application Priority Data
Jul. 9, 2021  (JP) .................... 2021-114562

(51) Int. Cl.
*G01C 21/36* (2006.01)
*G01C 21/32* (2006.01)
*G01C 21/34* (2006.01)

(52) U.S. Cl.
CPC ........... *G01C 21/367* (2013.01); *G01C 21/32* (2013.01); *G01C 21/3461* (2013.01)

(58) Field of Classification Search
CPC ... G01C 21/367; G01C 21/32; G01C 21/3461
See application file for complete search history.

(56) References Cited

U.S. PATENT DOCUMENTS 5,036,471 A * 7/1991 Tamura .................. G06F 30/18
                                                         701/428
5,966,135 A * 10/1999 Roy ....................... G06F 16/29
                                                         345/619

(Continued)

FOREIGN PATENT DOCUMENTS

| JP | 2002342330 A | * | 11/2002 | |
| JP | 2017-173286 A | | 9/2017 | |
| KR | 20100008676 A | * | 1/2010 | ......... G01C 21/3407 |

OTHER PUBLICATIONS

Machine translation of JP2002342330A (Year: 2024).*
Machine translation of KR20100008676A (Year: 2024).*

*Primary Examiner* — Aniss Chad
*Assistant Examiner* — Jennifer M Anda
(74) *Attorney, Agent, or Firm* — TROUTMAN PEPPER LOCKE LLP (57) ABSTRACT

A vehicle navigation apparatus includes a storage, a second map information acquisition unit, a display, and a display control unit. The storage stores first map information. The second map information acquisition unit acquires second map information. The display displays map data on the basis of at least one of the first map information or the second map information. The display control unit controls the form of displaying the map data on the display in accordance with a predetermined condition. The display control unit causes the map data to be displayed at a greater scale in a case where the map data is displayed on the basis of the second map information than in a case where the map data is displayed on the basis of only the first map information.

20 Claims, 9 Drawing Sheets

(56) References Cited

U.S. PATENT DOCUMENTS

| | | | | |
|---|---|---|---|---|
| 2006/0074553 | A1* | 4/2006 | Foo | G01C 21/367 340/995.15 |
| 2007/0225904 | A1* | 9/2007 | Pantalone | G01C 21/367 701/455 |
| 2010/0332119 | A1* | 12/2010 | Geelen | G01C 21/3664 701/533 |
| 2013/0093750 | A1* | 4/2013 | Cornell | G06T 17/05 345/419 |
| 2014/0317560 | A1* | 10/2014 | Hashimoto | G01C 21/367 715/788 |
| 2018/0052003 | A1* | 2/2018 | Xin | B62D 15/021 |
| 2019/0003851 | A1* | 1/2019 | Ishikawa | G09B 29/10 |
| 2020/0209370 | A1* | 7/2020 | Zhang | G01S 7/003 |
| 2020/0348145 | A1* | 11/2020 | Paranjpe | G01C 21/367 |
| 2021/0199444 | A1* | 7/2021 | Xie | G01C 21/32 |
| 2021/0262815 | A1* | 8/2021 | Lee | G01C 21/367 |
| 2021/0318128 | A1* | 10/2021 | Kim | B60W 30/14 |
| 2022/0090939 | A1* | 3/2022 | Pfeifle | G06F 3/147 |
| 2022/0349725 | A1* | 11/2022 | Chreptyk | G01C 21/32 |

* cited by examiner

VEHICLE NAVIGATION APPARATUS

CROSS-REFERENCE TO RELATED APPLICATION

The present application claims priority from Japanese Patent Application No. 2021-114562 filed on Jul. 9, 2021, the entire contents of which are hereby incorporated by reference.

BACKGROUND

The technology relates to a vehicle navigation apparatus.

In recent years, technologies relating to automatic driving, including driving assistance technologies, have seen remarkable progress and attracted a great deal of attention from around the world with many companies from different industries entering the market.

Among these automatic driving technologies, automatic driving with an automatic driving level 3 or higher (automatic driving at level 3 includes a driving assistance mode) is approaching a practical stage.

The automatic driving with an automatic driving level 3 or higher may involve acquiring a high-definition map including the latest information on details of objects on the ground from a server, for example, and performing automatic driving on the basis of the acquired information, for example.

In contrast, a vehicle navigation apparatus provides map data using a navigation map stored in an internal storage, searches the map data for an optimal route to a destination point, and performs route guidance on the basis of the result of search, as in a known method. Reference is made to Japanese Unexamined Patent Application Publication No. 2017-173286, for example.

SUMMARY

An aspect of the technology provides a vehicle navigation apparatus including a storage, a second map information acquisition unit, a display, and a display control unit. The storage is configured to store first map information including at least route information. The second map information acquisition unit is configured to acquire second map information including more detailed route information than the first map information. The display is configured to display map data on the basis of at least one of the first map information or the second map information. The display control unit is configured to control the form of displaying the map data on the display in accordance with a predetermined condition. The display control unit includes at least one processor and at least one memory communicably coupled to the at least one processor. The at least one processor is configured to cause the display to display the map data at a greater scale in a case where the map data is displayed on the basis of the second map information than in a case where the map data is displayed on the basis of only the first map information.

An aspect of the technology provides a vehicle navigation apparatus including a display, a storage, and circuitry. The display is configured to display map data on the basis of at least one of first map information or second map information. The storage is configured to store the first map information including at least route information. The circuitry is configured to acquire the second map information including more detailed route information than the first map information, and control a form of displaying the map data on the display in accordance with a predetermined condition. The circuitry is configured to cause the display to display the map data at a greater scale in a case where the map data is displayed on the basis of the second map information than in a case where the map data is displayed on a basis of only the first map information.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In a case where a display on a navigation apparatus is changed on the basis of high-definition map information acquired during automatic driving, a discrepancy can be generated between the high-definition map information and navigation map information on the way to a halfway point.

For example, in a case where the navigation map information is outdated, a vehicle traveling on a road which is existent in the high-definition map but inexistent in the navigation map is displayed as traveling in an area on the map with no road. This can make an occupant of the vehicle feel strange.

The navigation apparatus performs map matching so that the vehicle is displayed as traveling along a road whenever possible. However, in the condition described above, the vehicle is displayed as traveling in a zig-zag manner along the road. This can further make the occupant of the vehicle feel strange.

One possible solution to the above-described concern is to replace the navigation map information with the high-definition map information. However, since the high-definition map includes a large amount of data, only a predetermined range of a route is able to be downloaded. Thus, the navigation map information is able to be replaced with the high-definition map information only in the predetermined range. Accordingly, a map displayed at an ordinary scale includes a portion in which the navigation map information is replaced with the high-definition map information and a portion in which the navigation map information is not replaced with the high-definition map information. This can make the occupant of the vehicle feel strange.

It is desirable to provide a vehicle navigation apparatus that, in a case where a route on which the own vehicle is traveling in the automatic driving mode or the driving assistance mode is inexistent in the navigation map, reduces the strange feeling of the occupant of the vehicle by replacing a route based on the navigation map with a route based on a downloaded high-definition map information, and displaying a map on the navigation apparatus at a scale increased in accordance with the route after the replacement.

In the following, some example embodiments of the technology are described in detail with reference to FIGS. 1 to 8. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

A vehicle navigation apparatus 100 according to an example embodiment of the technology will now be described with reference to FIG. 1 to FIG. 5B.

Figure 1:
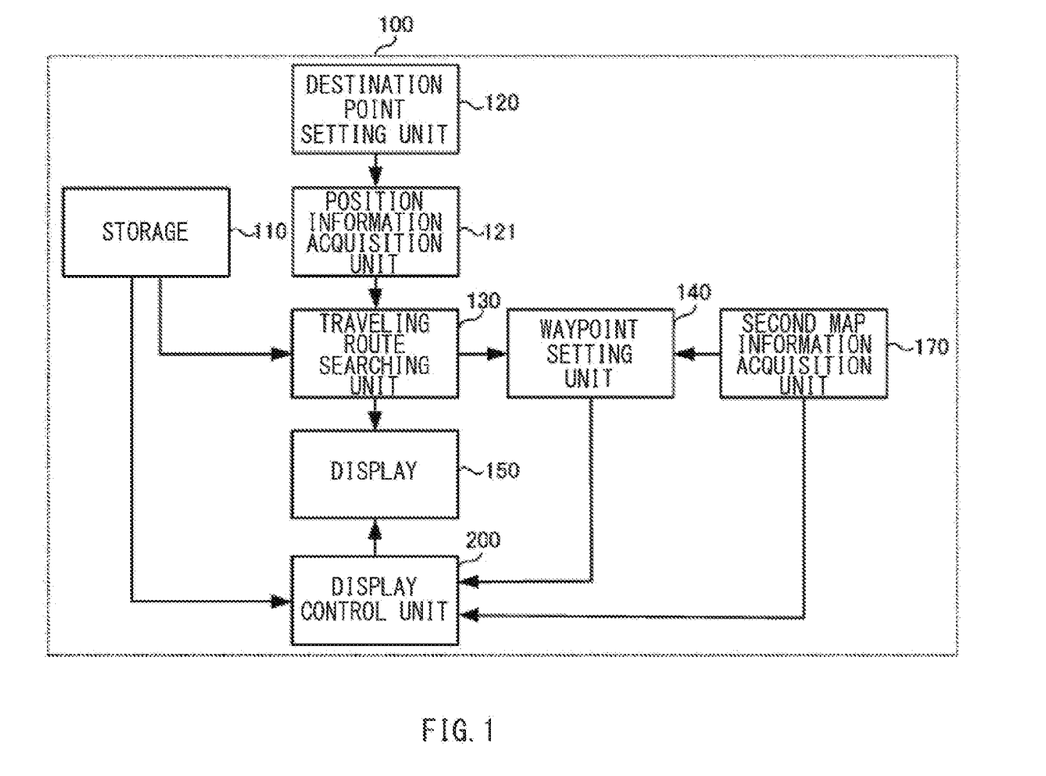
FIG. 1 is a block diagram illustrating an exemplary configuration of a vehicle navigation apparatus according to one example embodiment of the technology.

As illustrated in FIG. 1, the vehicle navigation apparatus 100 according to the first example embodiment may search navigation map information for route information on a route to a destination point set by a user or an occupant of a vehicle. In one embodiment, the navigation map information may serve as "first map information". The vehicle navigation apparatus 100 may display the route information on the basis of the retrieved route and the first map information to thereby provide route guidance to the user or occupant.

The navigation map information serving as the first map information may be updated at a constant interval.

The vehicle navigation apparatus 100 may receive information on road conditions such as traffic information, and display traffic congestion information about surrounding roads including the retrieved route in addition to the route information.

According to the first example embodiment of the technology, in a case where a driving entity of the own vehicle in which the vehicle navigation apparatus 100 is mounted is the vehicle itself and where map data is displayed on the basis of second map information that includes more detailed route information than the first map information does, the vehicle navigation apparatus 100 changes the form of displaying the map data on a display 150 (described below) on the basis of display control information received from a display control unit 200 (described below). The display control information may indicate an increased scale of display.

In the case where the map data is displayed on the basis of the second map information that includes more detailed route information than the first map information does, the display control unit 200 sends the display control information to the display 150 to change the form of displaying on the display 150. The display control information may be information on a scale of display of the route information increased in accordance with the acquired second map information.

As illustrated in FIG. 1, the vehicle navigation apparatus 100 according to the first example embodiment includes a storage 110, a destination point setting unit 120, a position information acquisition unit 121, a traveling route searching unit 130, a waypoint setting unit 140, a display 150, a second map information acquisition unit 170, and a display control unit 200.

The storage 110 stores the navigation map information serving as the first map information.

For example, the storage 110 may include a storage medium and a reading device. The storage medium may store the navigation map information necessary for navigation including map displaying, facility searching, and route searching. The reading device may read the navigation map information from the storage medium.

Alternatively, the storage 110 may include a hard disk device and a semiconductor memory.

The destination point setting unit 120 may set a destination point in response to an input by the user or occupant of the vehicle with a voice or sound or a touch panel operation.

The position information acquisition unit 121 may include, for example, a GPS receiver, an azimuth sensor, and a range sensor. The position information acquisition unit 121 may acquire information on the position (e.g., the latitude and longitude) of the own vehicle at a predetermined timing to thereby acquire own-vehicle position information.

The traveling route searching unit 130 may search the first map information for a traveling route in accordance with a predetermined search condition, such as an estimated traveling time from a departure point to the destination point set by the user or occupant of the vehicle.

In a case where the second map information acquisition unit 170 (described below) downloads a high-definition map via the Internet, for example, the waypoint setting unit 140 may set waypoints on the traveling route within the downloading capacity in which the second map information is able to be acquired. In one embodiment, the high-definition map may serve as the "second map information".

Examples of the waypoints may include an intersection between a route on the first map information and a route on the second map information.

The display 150 may be a liquid crystal display (LCD), for example. The display 150 may display images, such as a map image of a surrounding area around the position of the own vehicle, an intersection guidance image, or a searching result image that includes detailed information on facilities obtained as a result of facility searching, on the basis of image signals outputted from a navigation controller (not illustrated). The display 150 may display the map data on the basis of at least one of the first map information or the second map information.

The second map information acquisition unit 170 may download the high-definition map serving as the second map information via the Internet, for example. The high-definition map may be used in the automatic driving mode or the driving assistance mode.

The display control unit 200 may output the display control information to the display 150 to perform display control. On the basis of the display control information, each route information may be displayed on the display 150 at a scale increased in accordance with the downloading capacity of the waypoint setting unit 140.

Figure 5A:
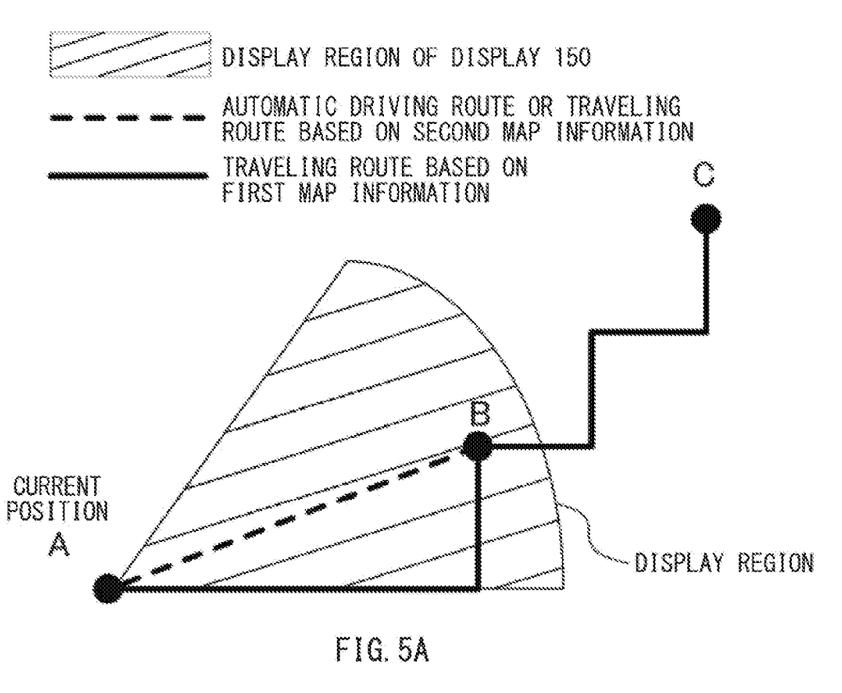
FIG. 5A is a diagram illustrating an exemplary route displayed before the map display scale changing process according to one example embodiment of the technology.
Figure 5B:
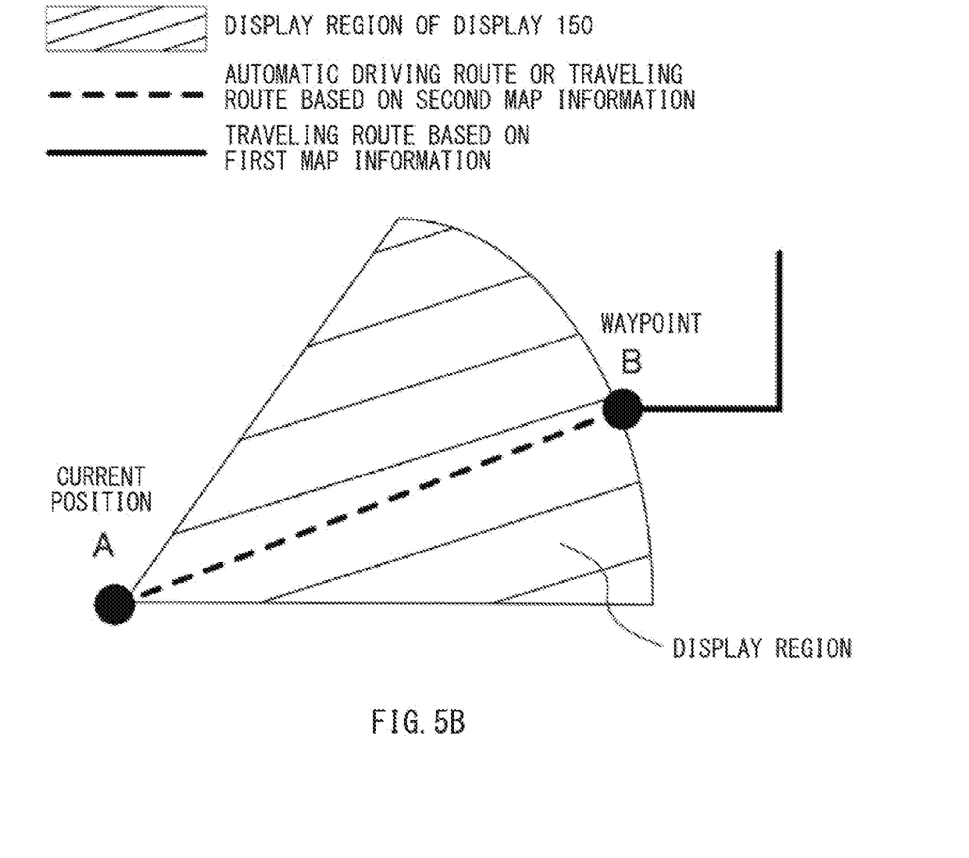
FIG. 5B is a diagram illustrating an exemplary route displayed after the map display scale changing process according to one example embodiment of the technology conducted on a route.

For example, as illustrated in FIG. 5A, in a case where the scale of display is not increased, the range of the traveling route information displayed on the display 150 is broader than the downloaded range of the traveling route information based on the second map information. As a result, the traveling route is displayed as being broken on the display 150. To address such a concern, a display control information generation unit 214 may generate the display control information for increasing the scale of display so that the range narrower than the range of the high-definition map downloadable via the Internet is displayed on the display 150. For example, as illustrated in FIG. 5B, the map data on a route to a next waypoint (e.g., a route from Point A, which is a current position of the own vehicle, to Point B in FIG. 5B) may be displayed at the increased scale.

Figure 2:
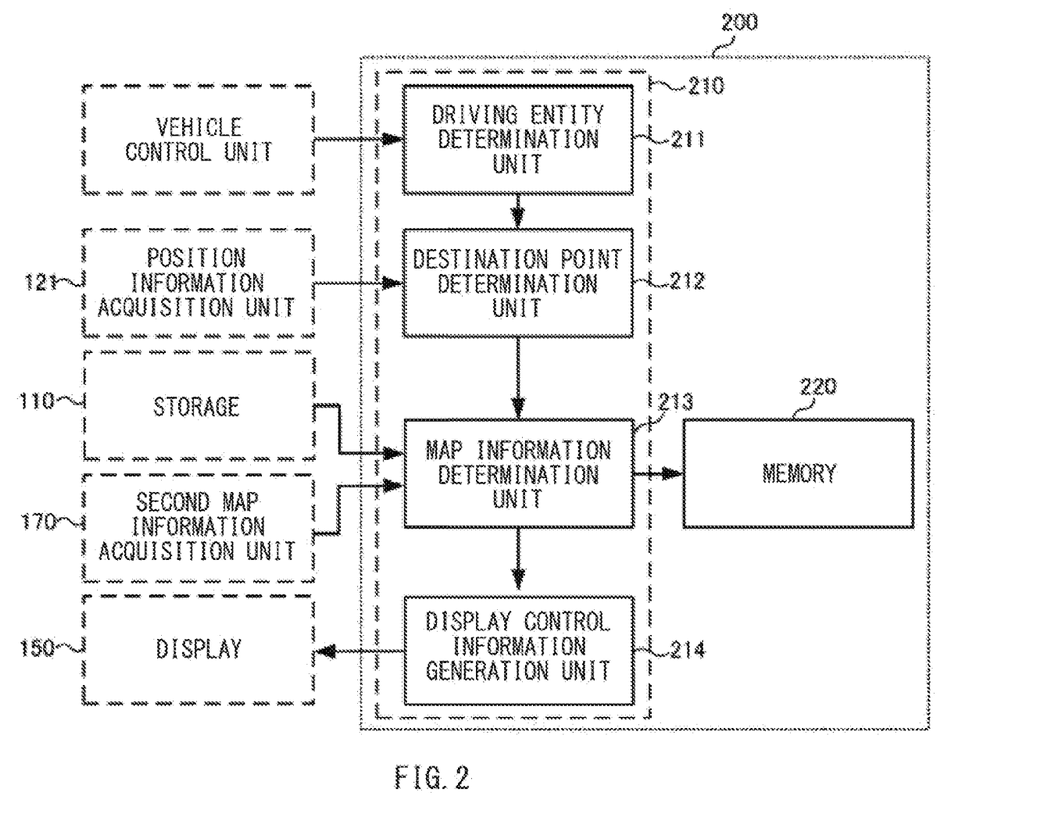
FIG. 2 is a block diagram illustrating an exemplary configuration of a display control unit according to one example embodiment of the technology.

As illustrated in FIG. 2, the display control unit 200 according to the first example embodiment includes at least one processor 210 and a memory 220 described below.

The processor 210 may comprehensively control the display control unit 200 in accordance with a control program stored in the memory 220 described below.

In the first example embodiment, the processor 210 may execute processes performed by a driving entity determination unit 211, a destination point determination unit 212, a map information determination unit 213, and a display control information generation unit 214 that are described below, for example.

The memory 220 may include, for example, a read-only memory (ROM) and a random access memory (RAM). The ROM may store programs including the control program described above, and the RAM may store various kinds of data, for example.

In the first example embodiment, the RAM may store information on determination by the map information determination unit 213 (described below) based on the route information stored in the storage 110 of the vehicle navigation apparatus 100, for example.

As illustrated in FIG. 2, the processor 210 may include the driving entity determination unit 211, the destination point determination unit 212, the map information determination unit 213, and the display control information generation unit 214.

The driving entity determination unit 211 may receive information as to whether the own vehicle is driven in the automatic driving mode or the driver assistance mode from, for example, a vehicle control apparatus mounted in the own vehicle, to thereby determine the driving entity of the own vehicle. The driving entity determination unit 211 may output the result of determination to the destination point determination unit 212.

The destination point determination unit 212 may determine whether a current position of the own vehicle received from the position information acquisition unit 121 is the destination point set by the destination point setting unit 120. The destination point determination unit 212 may output the result of determination to the map information determination unit 213.

In a case where the driving entity determination unit 211 determines that the driving entity is the vehicle and where the destination point determination unit 212 does not determine that the current position of the own vehicle is the destination point, the map information determination unit 213 may determine whether the traveling route based on the second map information is inexistent in the first map information by comparing the first map information stored in the storage 110 of the vehicle navigation apparatus 100 with the second map information or the high-definition map acquired by the second map information acquisition unit 170 to achieve the automatic driving mode or the driving assistance mode.

In a case where the map information determination unit 213 determines that the traveling route based on the second map information is inexistent in the first map information, the display control information generation unit 214 may stop map matching based on the first map information, and generate the display control information that causes the display to display a map of a route based on the second map information out of the traveling route from the current position of the own vehicle to the destination point at a scale increased in accordance with the route to be displayed on the display 150 on the basis of the second map information. The display control information generation unit 214 may send the generated display control information to the display 150.

Exemplary processing performed by the vehicle navigation apparatus 100 according to the first example embodiment will now be described with reference to FIG. 2 to FIG. 5B.

Figure 3:
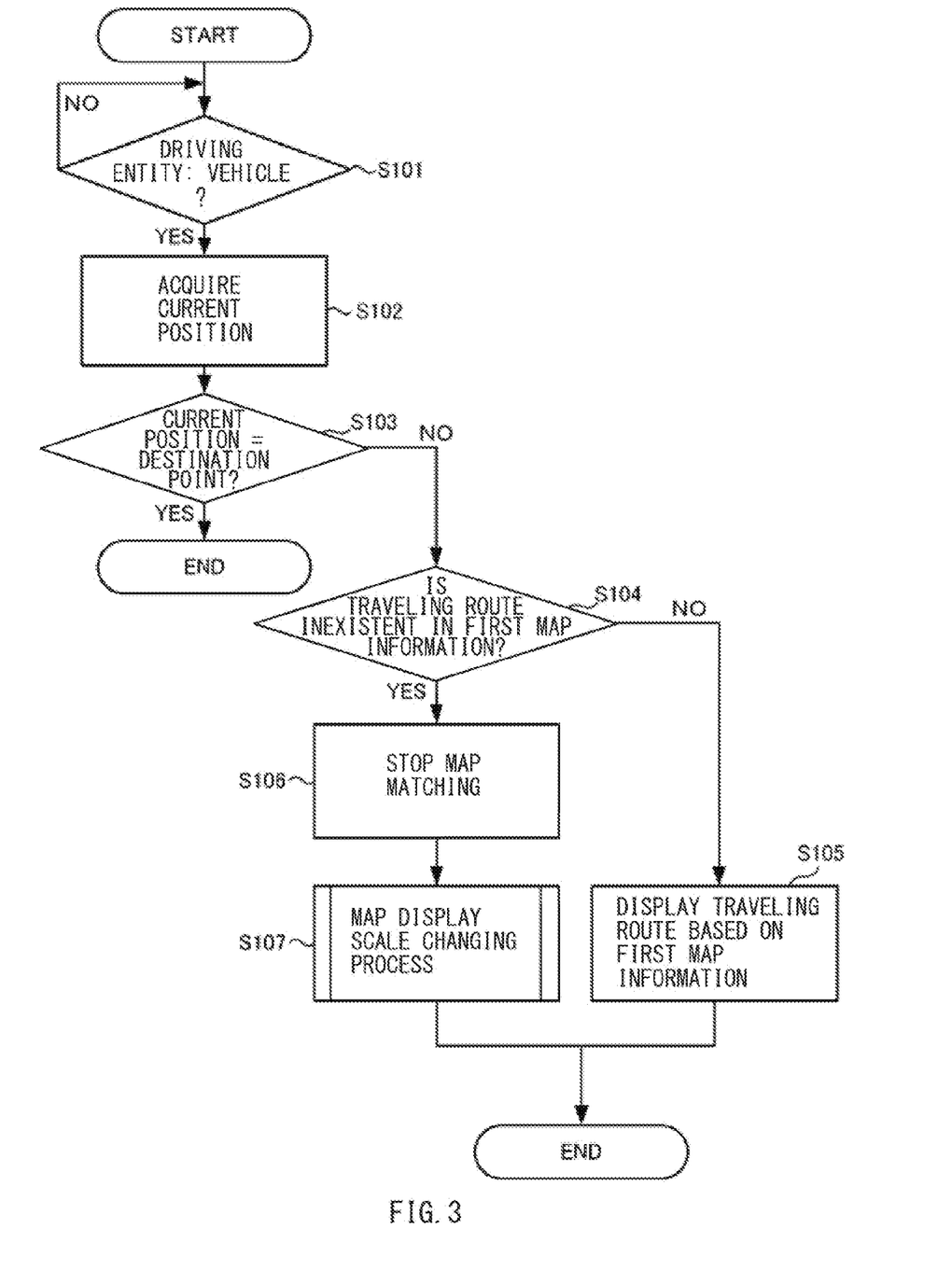
FIG. 3 is a flowchart of exemplary processing performed by the display control unit according to one example embodiment of the technology.

As illustrated in FIGS. 2 and 3, the driving entity determination unit 211 of the processor 210 may receive the information as to whether the own vehicle is driven in the automatic driving mode or the driving assistance mode from, for example, the vehicle control apparatus mounted in the own vehicle to thereby determine the driving entity of the own vehicle (Step S101).

If the driving entity determination unit 211 does not determine that the driving entity of the own vehicle is the vehicle (Step S101: NO), the processing may repeat Step S101.

In contrast, if the driving entity determination unit 211 determines that the driving entity of the own vehicle is the vehicle (Step S101: YES), the destination point determination unit 212 of the processor 210 may receive the information on the current position of the own vehicle from the position information acquisition unit 121 (Step S102), and determine whether the current position of the own vehicle is the destination point set by the destination point setting unit 120 (Step S103).

If the destination point determination unit 212 determines that the current position of the own vehicle is the destination point (Step S103: YES), the guidance performed by the vehicle navigation apparatus 100 may end.

In contrast, the destination point determination unit 212 does not determine that the current position of the own vehicle has reached the destination point (Step S103: NO), the map information determination unit 213 of the processor 210 may determine whether the traveling route on which the own vehicle is traveling is inexistent in the first map information stored in the storage 110 of the vehicle navigation apparatus 100 on the basis of the information on the current position of the own vehicle (Step S104).

If the map information determination unit 213 determines that the traveling route on which the own vehicle is traveling is inexistent in the first map information stored in the storage 110 (Step S104: YES), map matching for mapping the information on the current position of the own vehicle to the first map information may be stopped (Step S106).

The display control information generation unit 214 may perform a map display scale changing process in which the scale of display of the map based on the second map information is increased (Step S107), and generate the display control information.

The display control information generation unit 214 may send the generated display control information to the display control unit 200. The display control unit 200 may cause the display 150 to display the map data based on the second map information, and end the processing.

The map display scale changing process is described in detail below.

In contrast, if the map information determination unit 213 determines that the traveling route on which the own vehicle is traveling is existent in the first map information (Step S104: NO), the map information determination unit 213 may perform map matching for mapping the information on the current position of the own vehicle to the first map information.

Thereafter, the display 150 may display the traveling route based on the first map information at an ordinary scale (Step S105), and end the processing.

Figure 4:
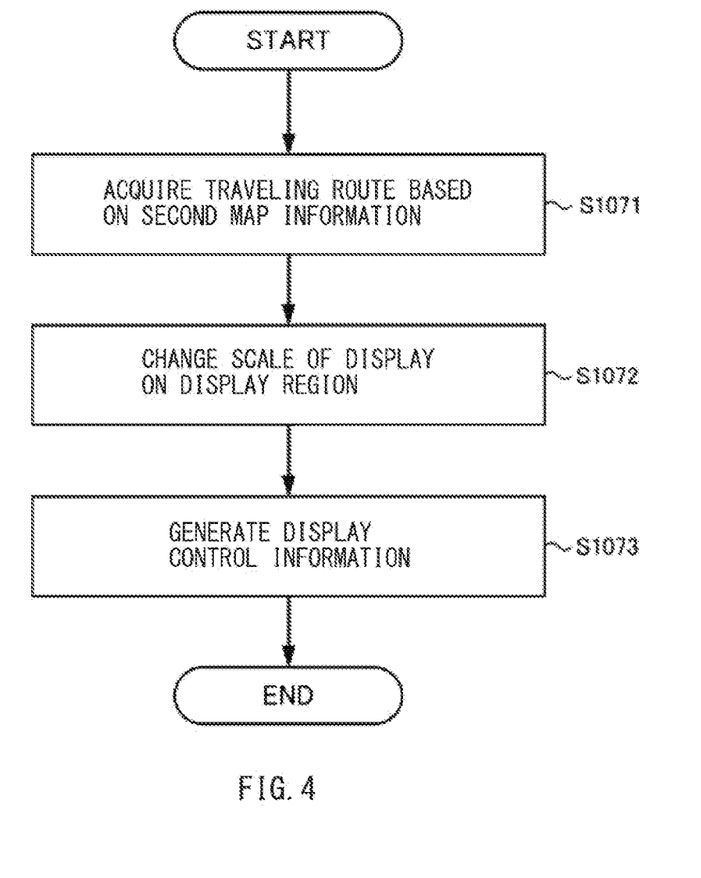
FIG. 4 is a flowchart of a map display scale changing process according to one example embodiment of the technology conducted on a route.

The map display scale changing process according to the first example embodiment will now be described with reference to FIG. 4 and FIGS. 5A and 5B. In FIGS. 5A and 5B, a hatched region may indicate a display region of the display 150, a dotted line may indicate an automatic driving route (i.e., the traveling route based on the second map information), and a solid line may indicate the traveling route based on the first map information.

The display control information generation unit 214 may acquire the traveling route information on the traveling route from the current position of the own vehicle to the waypoint set by the waypoint setting unit 140 (e.g., the region from Point A, which is the current position of the own vehicle, to Point B in FIG. 5B) based on the second map information downloaded by the second map information acquisition unit 170 via, for example, the Internet (Step S1071).

Thereafter, as illustrated in FIG. 5B, the display control information generation unit 214 increases the scale of display of the high-definition map information downloaded by the second map information acquisition unit 170 via, for example, the Internet (Step S1072), and generate the display control information based on the map data to be displayed at the increased scale (Step S1073).

Note that FIG. 5A illustrates the form of displaying the traveling route before changing the scale of display.

As described above, the vehicle navigation apparatus 100 according to the first example embodiment includes the display control unit 200, and the at least one processor 210 of the display control unit 200 determines the driving entity of the own vehicle.

If the at least one processor 210 of the display control unit 200 determines that the driving entity of the own vehicle is the vehicle, the at least one processor 210 may determine whether the traveling route on which the own vehicle is traveling is inexistent in the first map information.

If the at least one processor 210 of the display control unit 200 determines that the traveling route on which the own vehicle is traveling is inexistent in the first map information, the at least one processor 210 may acquire the traveling route information on the traveling route to the waypoint set by the waypoint setting unit 140 from the second map information acquisition unit 170, and display the high-definition map information downloaded via the Internet on the display 150 at an increased scale.

Accordingly, it is possible to reduce the strange feeling of the occupant of the vehicle that can be caused by route displaying based on only the first map information while reducing the processing load on the vehicle navigation apparatus 100.

A vehicle navigation apparatus 100A according to a second example embodiment will now be described with reference to FIGS. 6 to 8.

Note that components having configurations similar to those of the components in the first example embodiment are denoted with the same reference numerals without redundant description.

Figure 6:
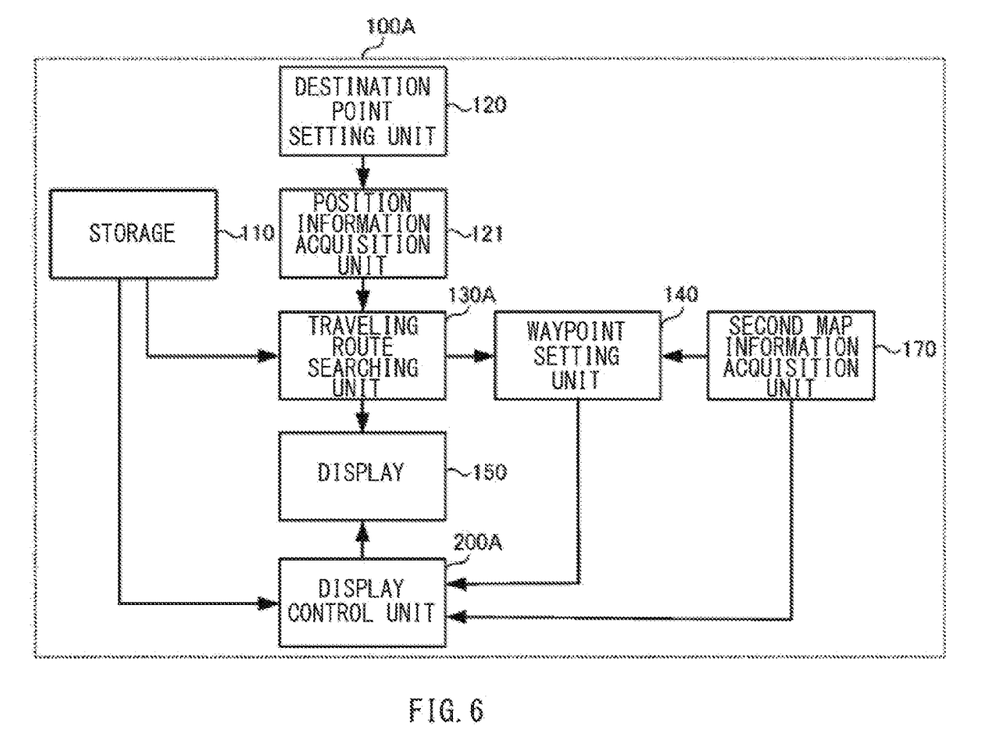
FIG. 6 is a block diagram illustrating an exemplary configuration of the vehicle navigation apparatus according to one example embodiment of the technology.

As illustrated in FIG. 6, the vehicle navigation apparatus 100A according to the second example embodiment may include the storage 110, the destination point setting unit 120, the position information acquisition unit 121, a traveling route searching unit 130A, the waypoint setting unit 140, the display 150, the second map information acquisition unit 170, and a display control unit 200A.

The traveling route searching unit 130A may search for a traveling route from a departure point to a destination point set by the user or occupant of the vehicle in accordance with a general-road-priority search condition.

In the case where the traveling route is retrieved in accordance with the general-road-priority search condition, the traveling route retrieved may possibly include, for example, a narrow width road, or a road lack of a sufficient number of guardrails, traffic signs, or other objects serving as guides for traveling in the automatic driving mode or the driving assistance mode, as compared with the case where the traveling route is retrieved in accordance with a condition based on roads including toll roads.

Thus, the retrieved traveling route may be inappropriate for traveling in the automatic driving mode or the driving assistance mode in which the driving entity is the vehicle itself.

In this case, while the own vehicle is traveling on a route different from the route displayed on the display 150, the vehicle is displayed as traveling in an area deviating from the retrieved route. This can make the occupant of the own vehicle feel strange.

Figure 7:
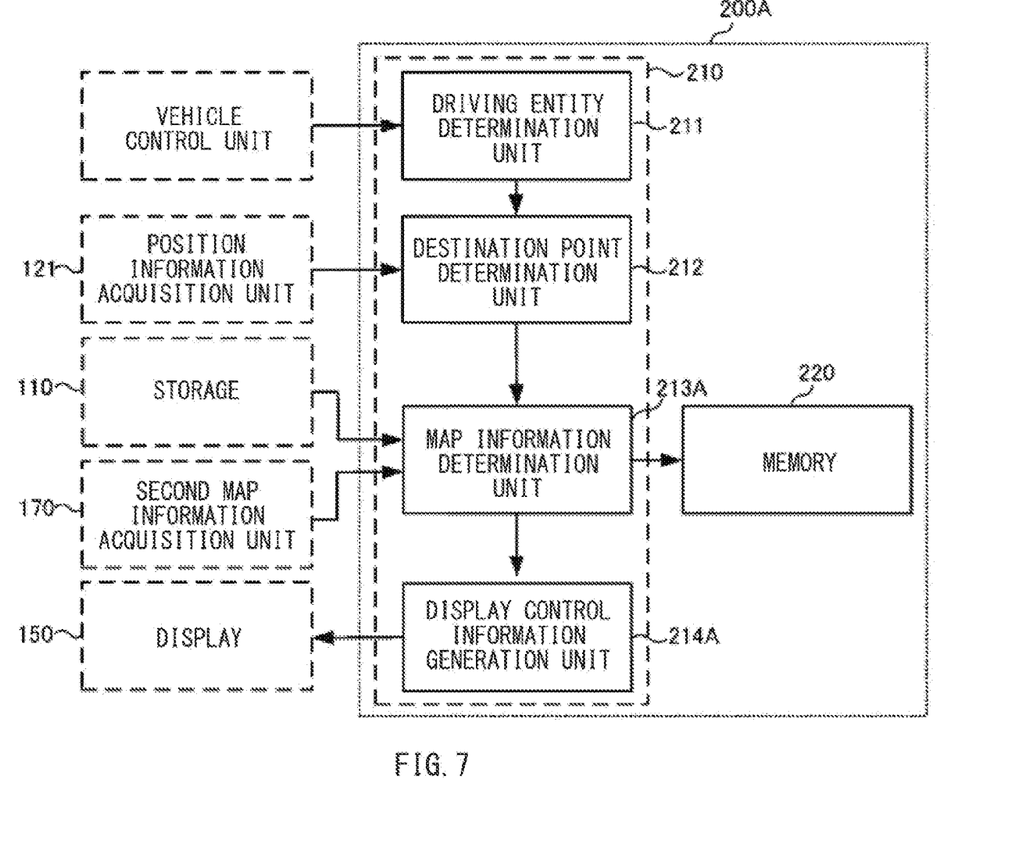
FIG. 7 is a block diagram illustrating an exemplary configuration of the display control apparatus according to one example embodiment of the technology.

As illustrated in FIG. 7, the display control unit 200A according to the second example embodiment includes the at least one processor 210 and the memory 220.

The processor 210 may comprehensively control the display control unit 200A in accordance with the control program stored in the memory 220 described below.

In the second example embodiment, the processor 210 may execute processes performed by the driving entity determination unit 211, the destination point determination unit 212, a map information determination unit 213A, and a display control information generation unit 214A that are described below, for example.

As illustrated in FIG. 7, the processor 210 may include the driving entity determination unit 211, the destination point determination unit 212, the map information determination unit 213A, and the display control information generation unit 214A.

In a case where the driving entity determination unit 211 determines that the driving entity is the vehicle and where the destination point determination unit 212 does not determine that the current position of the own vehicle is the destination point, the map information determination unit 213A may determine whether the traveling route based on the second map information is inexistent in the first map information by comparing the first map information stored in the storage 110 of the vehicle navigation apparatus 100A with the traveling route retrieved in accordance with the general-road-priority search condition based on the second map information acquired by the second map information acquisition unit 170 to achieve the automatic driving mode or the driving assistance mode.

In a case where the map information determination unit 213A determines that the traveling route retrieved in accordance with the general-road-priority search condition based on the second map information is inexistent in the first map information, the display control information generation unit 214A may stop map matching based on the first map information, and generate the display control information that causes the display 150 to display a map of a route based on the second map information out of the traveling route from the current position of the own vehicle to the destination point at a scale increased in accordance with the route based on the second map information. The display control information generation unit 214A may send the generated display control information to the display 150.

Exemplary processing performed by the vehicle navigation apparatus 100A according to the second example embodiment will now be described with reference to FIGS. 7 and 8. The following description focuses on features different from those of the first example embodiments.

Figure 8:
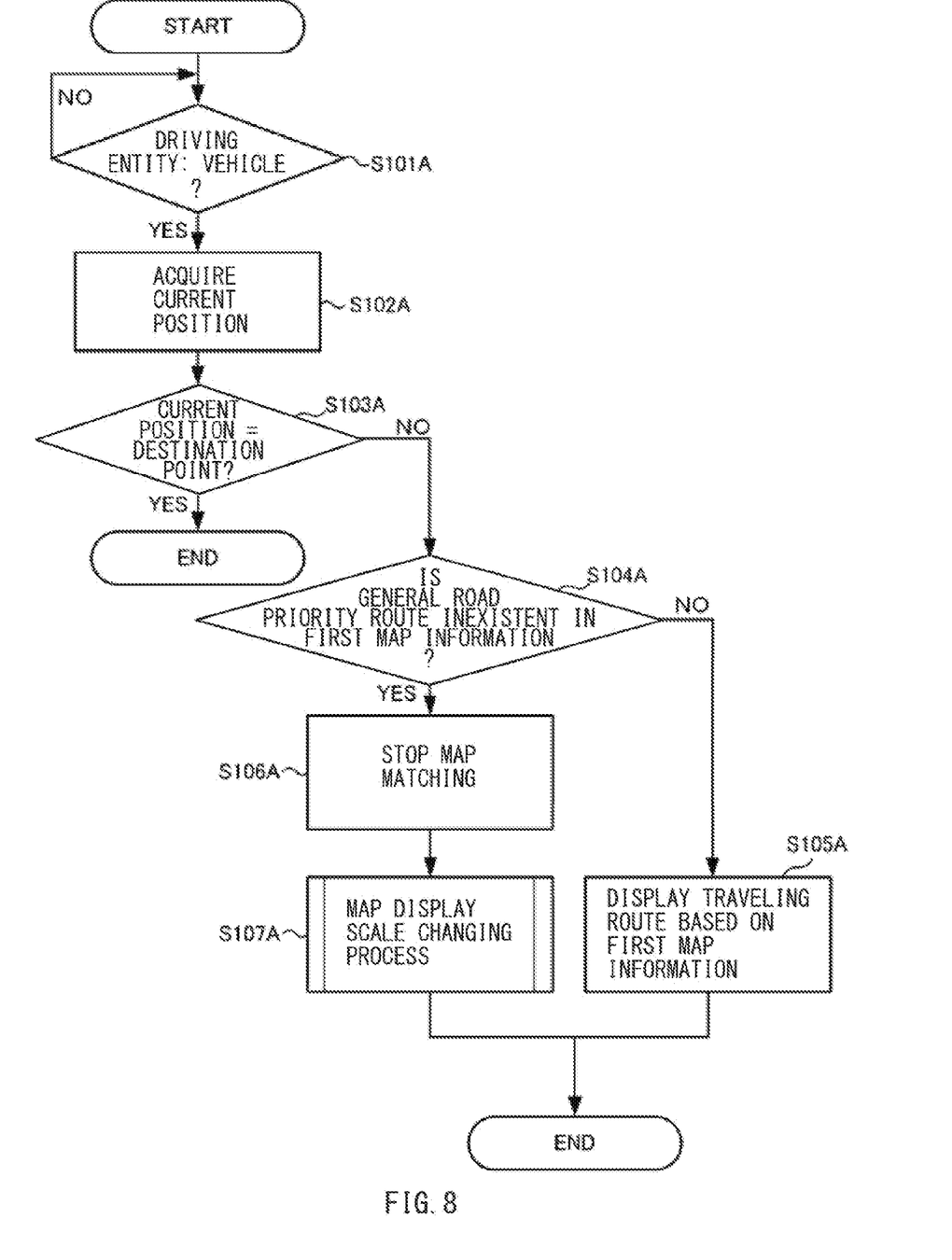
FIG. 8 is a flowchart of processing performed by the display control apparatus according to one example embodiment of the technology.

As illustrated in FIGS. 7 and 8, the driving entity determination unit 211 of the processor 210 may receive the information as to whether the own vehicle is driven in the automatic driving mode or the driving assistance mode from, for example, the vehicle control apparatus mounted in the own vehicle to thereby determine the driving entity of the own vehicle (Step S101A).

If the driving entity determination unit 211 does not determine that the driving entity of the own vehicle is the vehicle (Step S101A: NO), the processing may repeat Step S101A.

In contrast, if the driving entity determination unit 211 determines that the driving entity of the own vehicle is the vehicle (Step S101A: YES), the destination point determination unit 212 of the processor 210 may receive the information on the current position of the own vehicle from the position information acquisition unit 121 (Step S102A), and determine whether the current position of the own vehicle is the destination point set by the destination point setting unit 120 (Step S103A).

If the destination point determination unit 212 determines that the current position of the own vehicle is the destination point (Step S103A: YES), the guidance performed by the vehicle navigation apparatus 100A may end.

In contrast, the destination point determination unit 212 does not determine that the current position of the own vehicle has reached the destination point (Step S103A: NO), the map information determination unit 213A of the processor 210 may determine whether the traveling route of the own vehicle retrieved in accordance with the general-road-priority search condition is inexistent in the first map information stored in the storage 110 of the vehicle navigation apparatus 100A (Step S104A).

If the map information determination unit 213A determines that the traveling route on which the own vehicle is traveling is inexistent in the first map information stored in the storage 110 (Step S104A: YES), map matching for mapping the information on the current position of the own vehicle to the first map information may be stopped (Step S106A).

The display control information generation unit 214A may perform the map display scale changing process in which the scale of display of the map based on the second map information is increased (Step S107A), and generate the display control information.

The display control information generation unit 214A may send the generated display control information to the display control unit 200A. The display control unit 200A may cause the display 150 to display the map data based on the second map information, and end the processing.

Note that the map display scale changing process may be performed (Step S107A) as described in the first example embodiment.

In contrast, if the map information determination unit 213A determines that the traveling route on which the own vehicle is traveling is existent in the first map information (Step S104A: NO), the map information determination unit 213A may perform map matching for mapping the information on the current position of the own vehicle to the first map information.

Thereafter, the display 150 may display the traveling route based on the first map information at an ordinary scale (Step S105A), and end the processing.

As described above, the vehicle navigation apparatus 100A according to the second example embodiment includes the display control unit 200A, and the at least one processor 210 of the display control unit 200A determines the driving entity of the own vehicle.

If the at least one processor 210 of the display control unit 200A determines that the driving entity of the own vehicle is the vehicle, the at least one processor 210 may determine whether the traveling route retrieved in accordance with the general-road-priority search condition is inexistent in the first map information.

If the at least one processor 210 of the display control unit 200A determines that the traveling route retrieved in accordance with the general-road-priority search condition is inexistent in the first map information, the at least one processor 210 may acquire the traveling route information on the traveling route to the waypoint set by the waypoint setting unit 140 from the second map information acquisition unit 170, and display the high-definition map information downloaded via the Internet on the display 150 at an increased scale.

Accordingly, it is possible to reduce the strange feeling of the occupant of the vehicle that can be caused by route displaying based on only the first map information while reducing the processing load on the vehicle navigation apparatus 100A.

In a modification example of the example embodiments described above, the vehicle navigation apparatus may acquire road information for retrieving a detour route other than the traveling route from the vehicle control apparatus. The vehicle navigation apparatus according to the modification example may include a detour route searching unit and the display control unit. In a case where the driving entity of the own vehicle is the vehicle, the vehicle navigation apparatus may determine whether the detour route is inexistent in the first map information. If the detour route is inexistent in the first map information, the scale of a map to be displayed may be increased within a range less than the downloaded range of the high-definition map serving as the second map information, and the route based on the second map information or the high-definition map may be acquired from the second map information acquisition unit 170 and displayed on the display 150.

For example, in a case where the route retrieved on the basis of the first map information includes, for example, a narrow width road, or a road lack of a sufficient number of guardrails, traffic signs, or other objects serving as guides for traveling in the automatic driving mode or the driving assistance mode, the vehicle is displayed as traveling in an area deviating from the retrieved route while the own vehicle is traveling on a route different from the retrieved route. This can make the occupant feel strange.

In such a case, the detour route based on the second map information may be retrieved, the scale of display of the map may be increased within a range less than the downloaded range of the high-definition map serving as the second map information, and the route based on the second map information, which is the high-definition map, may be acquired from the second map information acquisition unit 170 and displayed on the display 150. Accordingly, it is possible to reduce the strange feeling of the occupant of the vehicle that can be caused by route displaying based on only the first map information while reducing the processing load on the vehicle navigation apparatus 100.

Note that the vehicle navigation apparatus 100 or 100A according to any of the example embodiments and the modification example of the technology is implemented by storing the processing to be performed by the processor 210 in a recording medium readable by a computer system, causing the memory 220 to read a program stored in the recording medium, and executing the program. The term "computer system" used herein may encompass hardware including operating systems (OS) and peripheral devices.

Note that a plurality of processors 210 may be provided, or a plurality of memories 220 may be provided.

In a case where the computer system is a world wide web (www) system, the term "computer system" used herein shall encompass a website providing environment or a display environment. Additionally, the program stored in, for example, the storage device of the computer system may be transmitted to another computer system via a transmission medium or a transmission wave of the transmission medium. The transmission medium transmitting the program may refer to a medium having a function of transmitting information, including a network such as the Internet (a communication network) and a communication line such as a phone line (a communication line).

Further, the program described above may be a program for implementing part of the processing performed by the vehicle navigation apparatus according to the example embodiment of the technology described above.

Alternatively, the program described above may be a so-called differential file or differential program that implements the processing performed by the vehicle navigation apparatus according to the example embodiment described above when being combined with a program having been stored in the computer system in advance.

Some example embodiments of the technology have been described above with reference to the drawings. However, specific configurations of the technology should not be limited to these example embodiments, and may be modified in variety of ways without departing from the gist of the technology. One or more of the second map information acquisition unit 170 in FIGS. 1 and 6, the display control unit 200 in FIG. 1, and the display control unit 200A in FIG. 6 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the second map information acquisition unit 170 and the display control unit 200 or 200A. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the second map information acquisition unit 170 and the display control unit 200 or 200A.

The invention claimed is:

1. A vehicle navigation apparatus configured to be applied to a vehicle, the vehicle navigation apparatus comprising:
a storage configured to store first map information including at least route information;
a display configured to display map data on a basis of at least one of the first map information or second map information; and
at least one processor and at least one memory communicably coupled to the at least one processor, the at least one memory storing instructions configured to cause the at least one processor to execute the instructions including:
downloading the second map information providing a traveling route along which the vehicle is traveling, the second map information including more detailed route information than the first map information;
determining whether the traveling route provided in the second map information is nonexistent in the first map information;
in response to the traveling route is determined to be existent in the first map information, displaying the map data on the display on a basis of the first map information at a first scale; and
in response to the traveling route is determined to be nonexistent in the first map information, displaying the map data on the display on a basis of the second map information at a second scale, the second scale being greater than the first scale.

2. The vehicle navigation apparatus according to claim 1, wherein the at least one processor is configured to execute the instructions to:
set a waypoint on the traveling route within a range in which the second map information is obtainable, wherein a route from a current position of the vehicle to the waypoint is displayed on the basis of the second map information at the second scale.

3. The vehicle navigation apparatus according to claim 2, wherein, in a case where the traveling route to a destination point is searched for in accordance with a road-priority search condition, the at least one processor is configured to cause the display to display a map of the route based the second map information at the second scale.

4. The vehicle navigation apparatus according to claim 1, wherein determining whether the traveling route provided in the second map information is nonexistent in the first map information comprises comparing the first map information with the second map information.

5. The vehicle navigation apparatus according to claim 1, wherein downloading the second map information comprises downloading the second map information via the Internet.

6. The vehicle navigation apparatus according to claim 1, where the first map information is navigation map information and the second map information is high-definition map information.

7. The vehicle navigation apparatus according to claim 1, wherein the at least one processor is configured to execute the instructions to:
in response to the traveling route is determined to be nonexistent in the first map information, replacing a corresponding portion of the first map information with at least a portion of the second map information,
wherein displaying the map data on the display on a basis of the second map information comprising displaying the map data on the display on a basis of the portion of the second map information after the replacement.

8. The vehicle navigation apparatus according to claim 1, wherein the vehicle is driven in an automatic driving mode or a driving assistance mode.

9. The vehicle navigation apparatus according to claim 1, wherein a range narrower than a range of the second map information is displayed on the display.

10. A vehicle navigation apparatus configured to be applied to a vehicle comprising:
a display configured to display map data on a basis of at least one of first map information or second map information;
a storage configured to store the first map information including at least route information; and
circuitry configured to:
download the second map information providing a traveling route along which the vehicle is traveling, the second map information including more detailed route information than the first map information,
determine whether the traveling route provided in the second map information is nonexistent in the first map information;
in response to the traveling route is determined to be existent in the first map information, display the map data on the display on a basis of the first map information at a first scale; and
in response to the traveling route is determined to be nonexistent in the first map information, display the map data on the display on a basis of the second map information at a second scale, the second scale being greater than the first scale.

11. The vehicle navigation apparatus according to claim 10, wherein determining whether the traveling route provided in the second map information is nonexistent in the first map information comprises comparing the first map information with the second map information.

12. The vehicle navigation apparatus according to claim 10, wherein the second map information is downloaded via the Internet.

13. The vehicle navigation apparatus according to claim 10, where the first map information is navigation map information and the second map information is high-definition map information.

14. The vehicle navigation apparatus according to claim 10, wherein the circuitry is configured to:
in response to the traveling route is determined to be nonexistent in the first map information, replace a corresponding portion of the first map information with at least a portion of the second map information,
wherein display the map data on the display on a basis of the second map information comprising display the map data on the display on a basis of the portion of the second map information after the replacement.

15. The vehicle navigation apparatus according to claim 10, wherein the vehicle is driven in an automatic driving mode or a driving assistance mode.

16. A vehicle navigation apparatus configured to be applied to a vehicle, the vehicle navigation apparatus comprising:
a display configured to display a map image;
a storage configured to store first map information including route information; and
circuitry configured to:
download second map information providing a traveling route along which the vehicle is traveling, the second map information including more detailed route information than the first map information;
determine whether the vehicle is driven in an automatic driving mode or a driving assistance mode;
in response to determining that the vehicle is driven in the automatic driving mode or the driving assistance mode, determine whether the traveling route provided in the second map information along which the vehicle is traveling is included in the first map information;
in response to determining that the traveling route is included in the first map information, (i) generate first display control information and (ii) control the display so that the display displays a first map image based on the first display control information at a first scale, the first map image being generated based only on the first map information; and
in response to determining that the traveling route is not included in the first map information, (i) generate second display control information and (ii) control the display so that the display displays a second map image based on the second display control information at a second scale, the second map image being generated based on the second map information, the second scale is set so that a displayed range of the map in the second map image is narrower than a range corresponding to the second map information.

17. The vehicle navigation apparatus according to claim 16, wherein the second scale is greater than the first scale.

18. The vehicle navigation apparatus according to claim 16, wherein the second map information is downloaded via the Internet.

19. The vehicle navigation apparatus according to claim 16, where the first map information is navigation map information and the second map information is high-definition map information.

20. The vehicle navigation apparatus according to claim 16, wherein the second map information providing a traveling route along which the vehicle is traveling.

* * * * *